Feb. 10, 1942.    W. E. SMITH    2,272,649
APPARATUS FOR SEPARATING GRANULAR MATERIALS
Filed July 31, 1940    2 Sheets-Sheet 1

INVENTOR
Walter E. Smith
BY
ATTORNEYS

Feb. 10, 1942. W. E. SMITH 2,272,649
APPARATUS FOR SEPARATING GRANULAR MATERIALS
Filed July 31, 1940 2 Sheets-Sheet 2
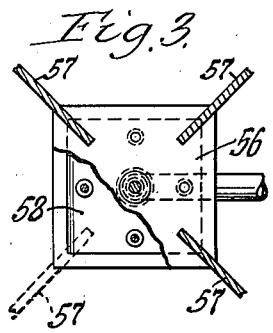
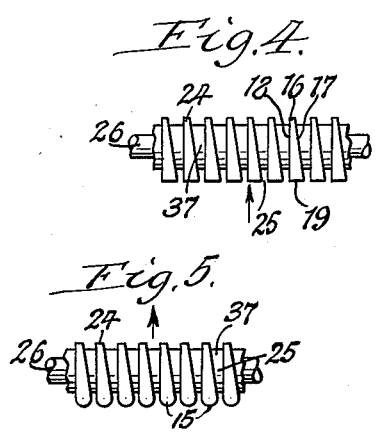
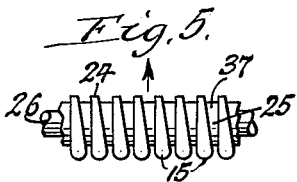
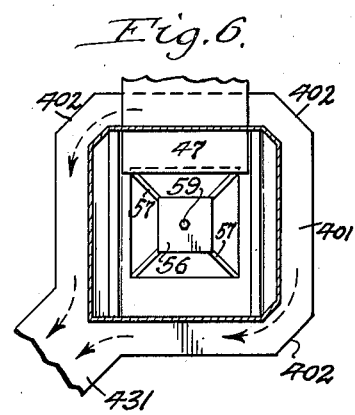
INVENTOR
Walter E. Smith
BY
ATTORNEYS Patented Feb. 10, 1942

2,272,649

UNITED STATES PATENT OFFICE 2,272,649

APPARATUS FOR SEPARATING GRANULAR MATERIALS

Walter E. Smith, Buffalo, N. Y.

Application July 31, 1940, Serial No. 348,810

4 Claims. (Cl. 209—21)

This invention relates to an apparatus for separating granular materials and more particularly for separating stone dust from coarse particles of stone so that the latter are better suited for building purposes.

When crushing stone, slag and the like, for the production of mineral aggregates of various sizes used in different engineering operations a dust is produced parts of which are lighter than air and incapable of being removed from the larger particles by screening operations. The formation of this dust is not only objectionable because it affects the health of the operators who breathe the same, but also on account of this dust adhering to the large particles of the aggregate, particularly when the latter is moist and therefore interferes with forming a perfect adhesion, union or bond between the coarse particles of the aggregate in concrete work and the like.

The same conditions occur in the production of flux rock for blast furnaces in which the formation of fine material causes surges that block the draft of the furnaces. In bituminous and asphaltic work the presence of dust is also objectionable inasmuch as dust on the surface of these materials prevents different parts thereof from adhering to one another in the same manner in which flour on dough reduces the adhesive qualities of the same.

The presence of dust, or so-called fines, is also objectionable when the specification for the concrete work includes sand and clean aggregate inasmuch as a high percentage of fines would throw the concrete unit off and produce various bad effects.

The objects of this invention are to provide an apparatus for effecting thorough separation of dust and fines from coarse aggregate and which permits of separating the fine and course elements of mixed granular materials quickly, efficiently and economically and without liability of clogging the apparatus.

In the accompanying drawings:

Fig. 3 is a fragmentary horizontal section taken on line 3—3 Fig. 1.

Fig. 4 is a fragmentary top plan view of several of the separating or screen bars which are used in the construction shown in Figs. 1 and 2, and which have flat front faces.

Fig. 5 is a similar view showing a modified form of screen bars having rounded front faces.

Fig. 6 is a sectional plan view on a reduced scale, showing a slightly different form of the means for drawing the dust away from the separating means compared with the means shown in Figs. 1 and 2.

In the following description similar characters of reference indicate like parts in the several figures of the drawings.

Referring to the construction shown in Figs. 1–4, the numeral 20 represents a bin, hopper or other source from which the mixture of granular materials, such as crushed stone, is delivered through an outlet 21 in the bottom 22 of this bin to the apparatus forming the subject of this invention for separating the fine material from the course material forming the mixture.

From the outlet of this bin or the like, the mixture flows by gravity downwardly in a stream through an upright treating channel 23 wherein it is subjected to the action of separating means whereby the fine particles of granular material are separated from the mixture and carried laterally out of the stream while the coarse particles of the mixture continue to flow downwardly with the stream and are discharged from the lower end of this channel where the same may be disposed of in any desired manner.

Figure 2:
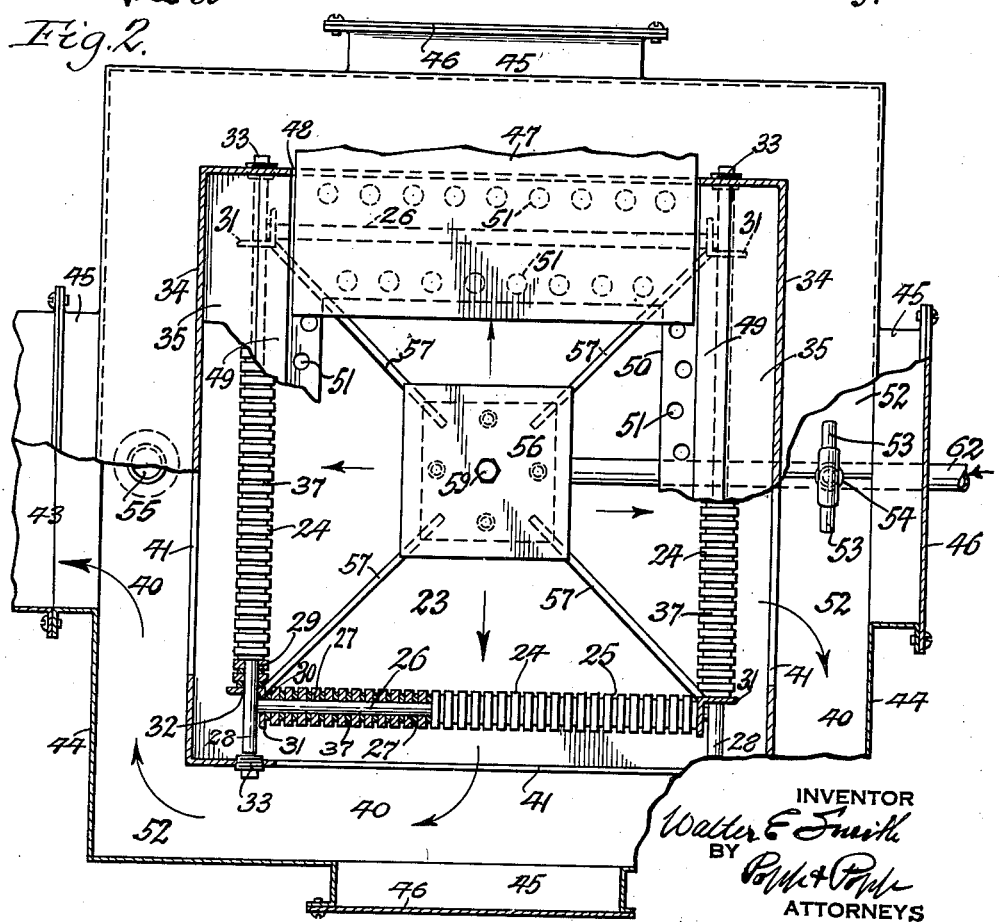
Fig. 2 is a horizontal section taken on line 2—2 Fig. 1.

The specific form of separating means employed in the construction shown in Figs. 1–4 are constructed as follows:

The numeral 24 represents a plurality of upright separating bars which are arranged in four sets around the treating channel so as to form in effect a rectangular separating screen around the same. Each of these separating bars is mounted at one end on a support while its opposite end is free to move and the several bars are spaced from one another so as to form vertical slots 25 between adjacent separating bars. In the preferred construction of the bars of each set are arranged in a straight row and the bars of two of these sets are arranged on opposite sides of the treating channel on one diametrical line and each of these sets is pivotally mounted by a short horizontal supporting rod 26 passing through corresponding openings 27 in the upper ends of the separating bars. The separating bars of the other two sets are arranged on opposite sides of the treating channel on another diametrical line so as to alternate with the first mentioned set and the separating bars of the last mentioned set and are pivotally mounted at their upper ends by comparatively long horizontal supporting rods passing through corresponding openings 29 in the upper ends of the respective separating bars. The short rods 26 of two sets of separating bars engage with openings 30 in the upper ends of upright posts 31 forming part of the stationary frame and the long rods 28 of the other two sets of separating rods engage with openings 32 in said posts and extend across the adjacent ends of the short rods 26, as shown in Fig. 2.

Figure 1:
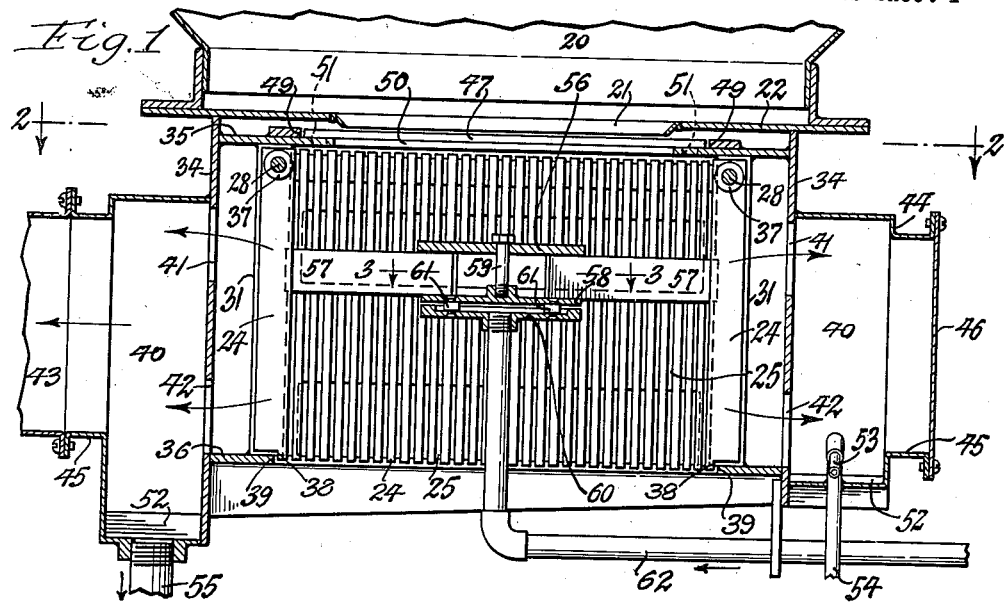
Fig. 1 is a vertical section of an apparatus for separating granular materials embodying one form of this invention.

When assembling the apparatus the short supporting rods 26 are slipped through the openings 27 of the respective separating bars 24 and engaged at their ends with the openings 30 in the frame posts 31 and then the long supporting rods 28 are slipped through the openings 29 of the other sets of separating bars and engaged with the openings 32 of the frame posts 31 and extended across the respective ends of the short supporting rods 26, thereby holding the latter against longitudinal displacement. The long supporting rods 28 are held against longitudinal displacement by screw plugs 33 normally arranged opposite the outer ends of the long supporting rods and secured in openings formed in the adjacent upright side walls 34 of a rectangular housing which surrounds the outer sides of the separating bars but is spaced therefrom and extends downwardly from the underside of the bottom 22 of the mixed material supply bin 20, as shown in Fig. 1. The housing of which walls 34 form parts is completed by an upper horizontal flange 35 which projects inwardly from the upper end of the wall 34 over the upper ends of the separating bars 24 and a lower horizontal flange 36 projecting inwardly from the lower end of the wall 34 underneath the lower ends of the separating bars, as shown in Fig. 1. The several separating bars are held in their properly spaced relation for maintaining the width of the slots 25 between them by means of spacing washers or rings 37 arranged on the supporting rods between the upper ends of these bars.

Normally the separating bars 24 hang by gravity in a vertical pendant position from the respective supporting rods and the slots between the same are of uniform size.

When the apparatus is in operation an outward pressure is exerted against these bars by a stream of air entering the lower end of the treating channel 23 and the descending mixed granular materials which are drawn against the inner sides or faces of said separating bars by this stream of air while these materials are flowing downwardly through the treating channel or space. During this operation the fine particles of the mixture, such as dust, pass outwardly through the slots between the separating bars and into the space outside of the same while the coarse particles which are larger than these slots will be retained on the inner or front faces of the separating bars and discharged at the lower end of the treating channel. During such outward flow of air and fine or small granular particles through the slots between the separating bars and the pressure of the large or coarse particles against the inner side of the separating bars the latter may be moved outwardly to some extent without materially altering the size of the slots between them, thereby producing a substantially uniform grade in the separation between the fine and coarse materials of the granular mixture. If, however, any granular particles should become stuck in said slots the outward pressure of the air against the inner side of the material which clogs the respective separating bars would be increased and thereby cause the latter to swing inward to a greater extent and increase the size of the respective slots, whereby the clogged material is released and permitted to flow away with the stream of air and also permit the respective separating bars to again swing outwardly into their normal working position. As a result of this action the separating bars are automatically cleared of obstructions and the apparatus is not interrupted in its work and its output is not materially reduced.

In order to prevent undue outward deflection of the separating bars due to the action of the air and the outward movement of the granular material against the same, stop means are provided which preferably consists of a movable stop 38 arranged on the lower end of each separating bar and adapted to engage a stationary stop 39 which is preferably formed by the inner edge of the lower housing flange or plate 36, as shown in Fig. 1. The separating bars may be of any desired shape in cross section but it is preferable to so form them that the slots between them are narrow at their front or inlet ends and gradually widen or flare toward their rear or discharge ends. As shown in Fig. 4 this is accomplished by providing each of separating bars with a flat front face 19, a flat face 18 on one of its lateral sides which is arranged at right angles to the front flat face, and an inclined face 17 on its opposite lateral side so that the two side faces converge from the wide front face 19 to the narrow rear face 16 of this bar. If desired the front face of each separating bar may be rounded crosswise, as shown at 15, in Fig. 5, which construction reduces the liability of clogging the screen to a minimum. In both of these forms the outward widening or flaring of the slots permits any material caught in the narrow parts of the slots to clear itself as the bars are swung backwardly by the pressure of the air and material against the same and thus aid in automatically cleaning the screen and keeping the same in good working condition over its entire surface.

Although various means may be employed for producing an outwardly flowing stream of air through the slots between the separating bars of the screen the means shown in Figs. 1 and 2 are constructed as follows:

The numeral 40 represents a rectangular suction chamber which surrounds the housing wall 34 and communicates with the space outside of the separating bars by means of upper and lower openings 41, 42 in the wall. An outward air pressure is produced in this suction chamber by connecting the central part of one or another flat side of its rectangular wall with a suction conduit 43 which is connected with pneumatic means of any suitable character whereby the air is exhausted from the material treating channel enclosed by the separating bars and fine granular particles are separated from the coarse particles and carried through the slots between the separating bars to the place where the exhausting device discharges these fine particles. As shown in Figs. 1 and 2 each of the four upright outer walls 44 of the suction chamber is provided with a tubular coupling neck 45 to any one of which the suction conduit may be connected to suit the machine to any particular location, those necks which are not in use being closed by a removable cover 46, as shown in Figs. 1 and 2. Instead of connecting the suction conduit 43 with the central part of one of the coupling necks 45, as shown in Fig. 2 this suction conduit, as shown at 43¹ in Fig. 6 may be connected with one corner of a suction chamber 40¹ which is of rectangular form and surrounds the screen housing and has its remaining corners 40² bevelled so as to streamline the path of the air and dust through the same from the different parts of the bar screen to the outlet of this suction chamber and thereby cut down the power required for operating this apparatus.

In the organization of this apparatus it is advisable to provide a suction area through the suction chamber which is less than the volume or capacity of the slots between the separating bars in order to reduce the pressure of air through the slots between these bars from the front sides to the rear sides of the same and ensure an ample volume of air for effectively separating the fine particles from the coarse particles as the stream of mixed granular materials flows downwardly past the front sides or faces of these bars. By providing the upright wall 34 of the housing with upper and lower openings 41, 42 the flow of air through the slots between the separating bars is distributed more uniformly over these slots throughout the height of the bars and thus increases the output of the apparatus and causes the bars to wear evenly throughout their length and maintain the proper grading of the materials.

For the purpose of enabling the feeding of granular material to the apparatus to be regulated valve means are provided which preferably include a gate 47 which slides horizontally through an opening 48 in the side of the wall 34 and engages the opposite edges of its inner part with the upper side of two opposed parts of the flange 35 which form a bottom guide for said gate and two side rails 49 arranged on the respective flange parts and forming side guides for said gate. By moving the gate transversely more or less from the exterior of the apparatus over the opening 50 which forms the upper inlet through which the granular material enters this housing and the treating channel it is possible to regulate the supply of material to suit the character of the same or the conditions under which the machine is operating.

In order to prevent any material from lodging permanently on the guide portions of the housing flange 35 the latter are provided at suitable intervals with openings 51 through which this material will drop when pushing the gate inwardly thereby permitting of properly regulating the feed of material.

Inasmuch as dust and light fine particles which are separated from the heavier and coarse particles are liable to settle on the bottom of the suction chamber means are provided for removing them when necessary so as to maintain the apparatus in the best condition. This purpose may be readily accomplished by constructing the lower portion of the suction chamber so that it forms a gutter or flume and introducing water into one part of this flume for creating a stream therein which will pick up the dust and light particles therein and carry the same to a drain which discharges the same to a sewer or other desired place. As shown in Figs. 1 and 2 the bottom of the suction chamber is constructed to form two gutters or flumes 52 arranged on opposite sides of the suction chamber and having two of their adjacent ends elevated and inclining toward the other two adjacent ends of same. Above the elevated end of each gutter is arranged a nozzle 53 through which water is delivered to the respective gutter and these nozzles are supplied from a pipe 54 having any suitable means (not shown) for controlling the flow of water. At the lower ends of both gutters a drain or discharge pipe 55 is provided into which the water carrying the dust from the suction chamber is delivered thereby preventing accumulation of such material in the suction chamber.

Baffle means are provided within the treating channel whereby the stream of granular mixture as it flows downwardly through this channel is deflected laterally outward toward the inner side of the screen or separating bars and thus assist in effecting the separation between the fine and coarse particles of the mixture. Suitable means for this purpose shown in Figs. 1 and 2 include an upper baffle plate 56 of rectangular form arranged horizontally in the central part of the treating channel and resting on the inner ends of a plurality of frame bars or arms 57 projecting inwardly from the corner posts 31 of the screen frame, a lower clamping plate 58 of the same form as the baffle plate 56 engaging with the underside of said frame bars or arms, and a vertical clamping bolt or screw 59 connecting the central parts of these plates. As the granular material flows downwardly in the treating channel it strikes the baffle plate 56 and is scattered or deflected laterally thereby in all directions toward the several separating bars and thus distributes the screening operation over the entire surface of the screen members. If it is desirable to raise the baffle plate relative to the supporting arms 57 for bringing this plate into a different position to suit some kinds of material which is being treated this can be readily done by loosening the clamping bolt 59 placing the required number of shims between this plate and the supporting arms and then tightening the clamping bolt 59.

It is desirable at times to assist the suction which is exerted by the air in the suction chamber against the stream of material on the inner or front side of the separating or screen bars and for this purpose means are provided whereby air or other fluid under pressure may be delivered outwardly against the inner side of this stream. This is accomplished in the construction shown in Figs. 1 and 2 by a fluid delivery nozzle which is formed by the clamping plate 58 and a nozzle plate 60 connected with the underside of the clamping plate by spacers 61 so as to produce a delivery space between these plates which opens at its periphery in all directions to the several separating bars of the screen, and a fluid supply pipe 62 connected with the nozzle plate and adapted to deliver a fluid under pressure of any available source to the nozzle space. When delivering compressed air by this nozzle the same assists in drawing the mixture toward the separating bars and removing the fine particles therefrom, but if desired dry steam may be delivered by this nozzle outwardly against the stream of mixed granular material and thereby not only assist in separating the dust therefrom but also laying this dust by mixing therewith and enabling it to be removed more readily.

I claim as my invention:

1. An apparatus for separating fine and coarse granular materials, comprising a channel through which a stream of mixed granular materials is adapted to flow downwardly, a plurality of upright separating bars arranged around said channel and supported at their upper ends while the lower ends of said bars are free to move away from and toward said stream, means for supplying said mixed materials to the upper end of said channel, an exhaust chamber which surrounds the outer sides of the bars and which is connected with an exhausting device whereby the stream of materials while descending said channel is drawn laterally outward toward said separating bars and the fine particles in said material are carried through the spaces between said bars and into said exhaust chamber while the coarse particles continue downwardly in said channel, and means for supporting said bars including a frame having an upright side wall arranged around the outer side of said bars, an upper horizontal flange projecting inwardly from the upper edge of said wall over the upper ends of said bars, a lower horizontal flange projecting inwardly from the lower edge of said wall underneath the lower ends of said bars, comparatively short horizontal supporting rods passing through the upper ends of some of said bars and each engaging its opposite ends with parts of said frame, and comparatively long horizontal supporting rods passing through the upper ends of others of said bars and across the respective ends of said short supporting rods and engaging with adjacent parts of said frame.

2. An apparatus for separating fine and coarse granular materials, comprising a channel through which a stream of mixed granular materials is adapted to flow downwardly, a plurality of upright separating bars arranged around said channel and supported at their upper ends while the lower ends of said bars are free to move away from and toward said stream, means for supplying said mixed materials to the upper end of said channel, an exhaust chamber which surrounds the outer sides of the bars and which is connected with an exhausting device whereby the stream of materials while descending said channel is drawn laterally outward toward said separating bars and the fine particles in said material are carried through the spaces between said bars and into said exhaust chamber while the coarse particles continue downwardly in said channel and means for delivering fluid from the central part of said channel outwardly toward said bars.

3. An apparatus for separating fine and coarse granular materials, comprising a channel through which a stream of mixed granular materials is adapted to flow downwardly, a plurality of upright separating bars arranged around said channel and supported at their upper ends while the lower ends of said bars are free to move away from and toward said stream, means for supplying said mixed materials to the upper end of said channel, an exhaust chamber which surrounds the outer sides of the bars and which is connected with an exhausting device whereby the stream of materials while descending said channel is drawn laterally outward toward said separating bars and the fine particles in said material are carried through the spaces between said bars and into said exhaust chamber while the coarse particles continue downwardly in said channel and means for delivering fluid from the central part of said channel outwardly toward said bars including two superposed plates which are spaced apart to form a passage which opens at the periphery of said plates, and a fluid supply pipe discharging into the central part of said passage.

4. An apparatus for separating fine and coarse granular materials, comprising a channel through which a stream of mixed granular materials is adapted to flow downwardly, a plurality of upright separating bars arranged around said channel and supported at their upper ends while the lower ends of said bars are free to move away from and toward said stream, means for supplying said mixed materials to the upper end of said channel, an exhaust chamber which surrounds the outer sides of the bars and which is connected with an exhausting device whereby the stream of materials while descending said channel is drawn laterally outward toward said separating bars and the fine particles in said material are carried through the spaces between said bars and into said exhaust chamber while the coarse particles continue downwardly in said channel and a baffle arranged in the central part of said channel and adapted to deflect the stream of materials toward the inner side of said separating bars and including frame bars projecting into said channel, upper and lower plates arranged above and below said bars, and a screw connecting said plates and clamping them against said frame bars.

WALTER E. SMITH.